Patented May 26, 1925.

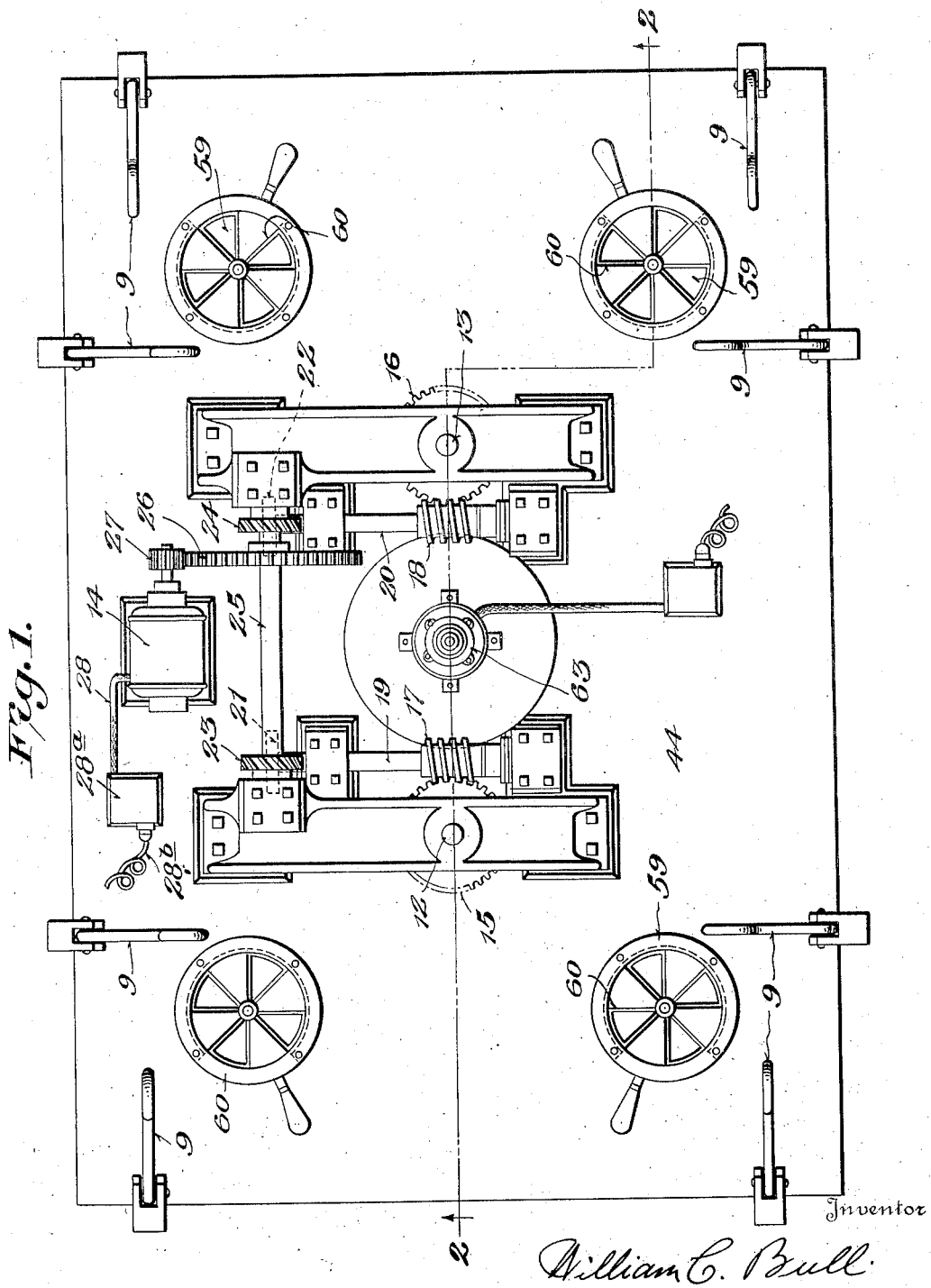

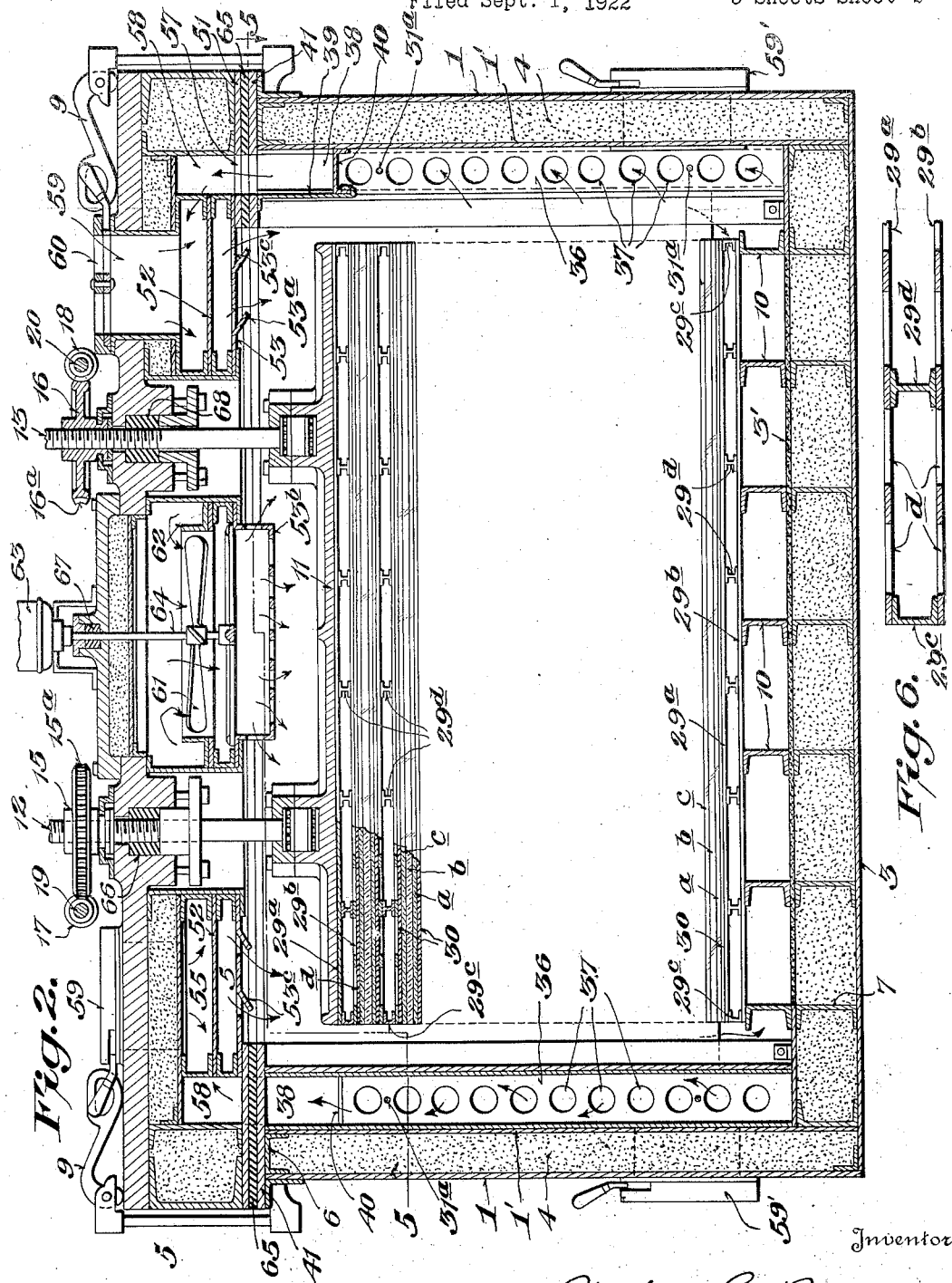

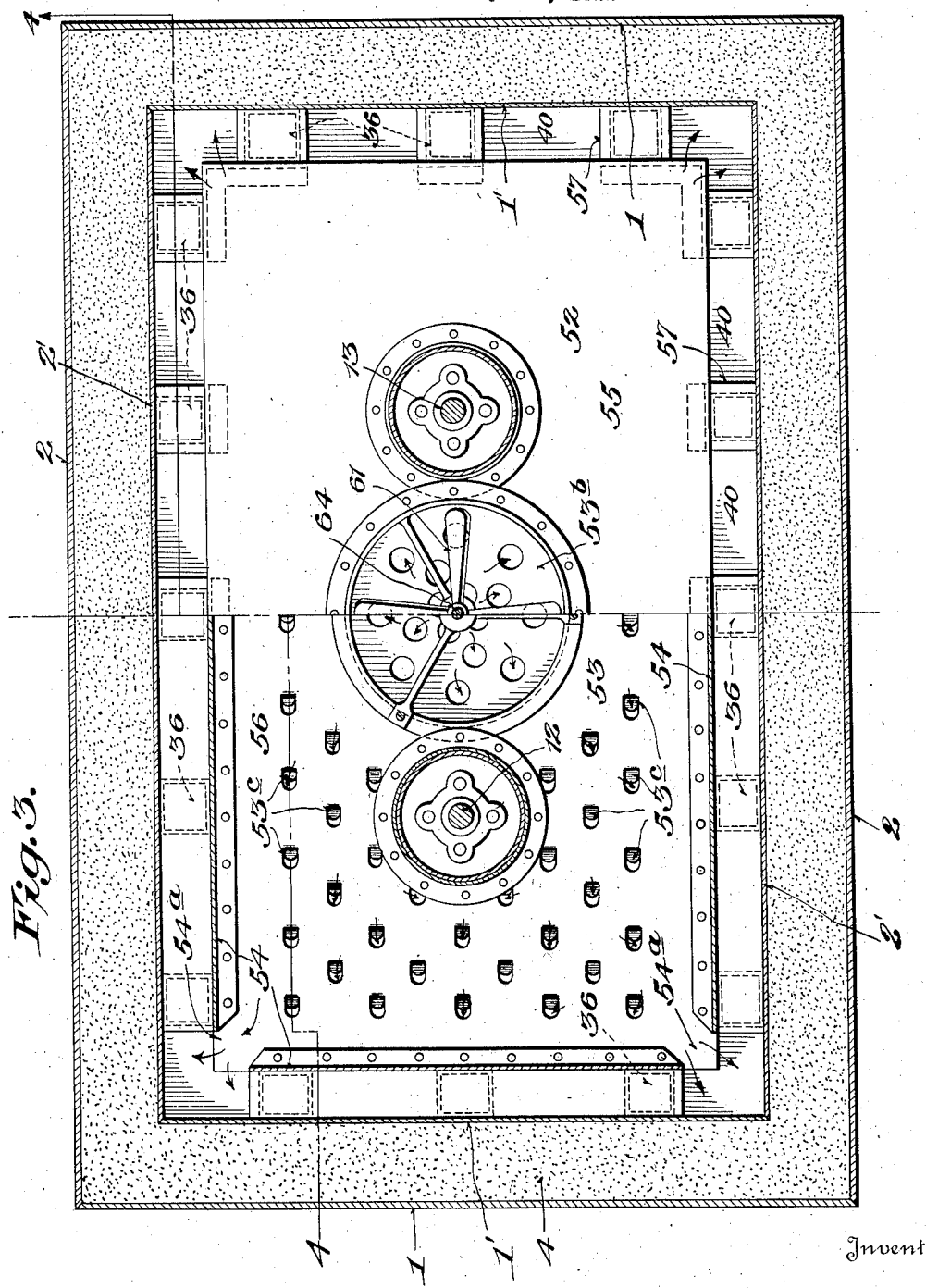

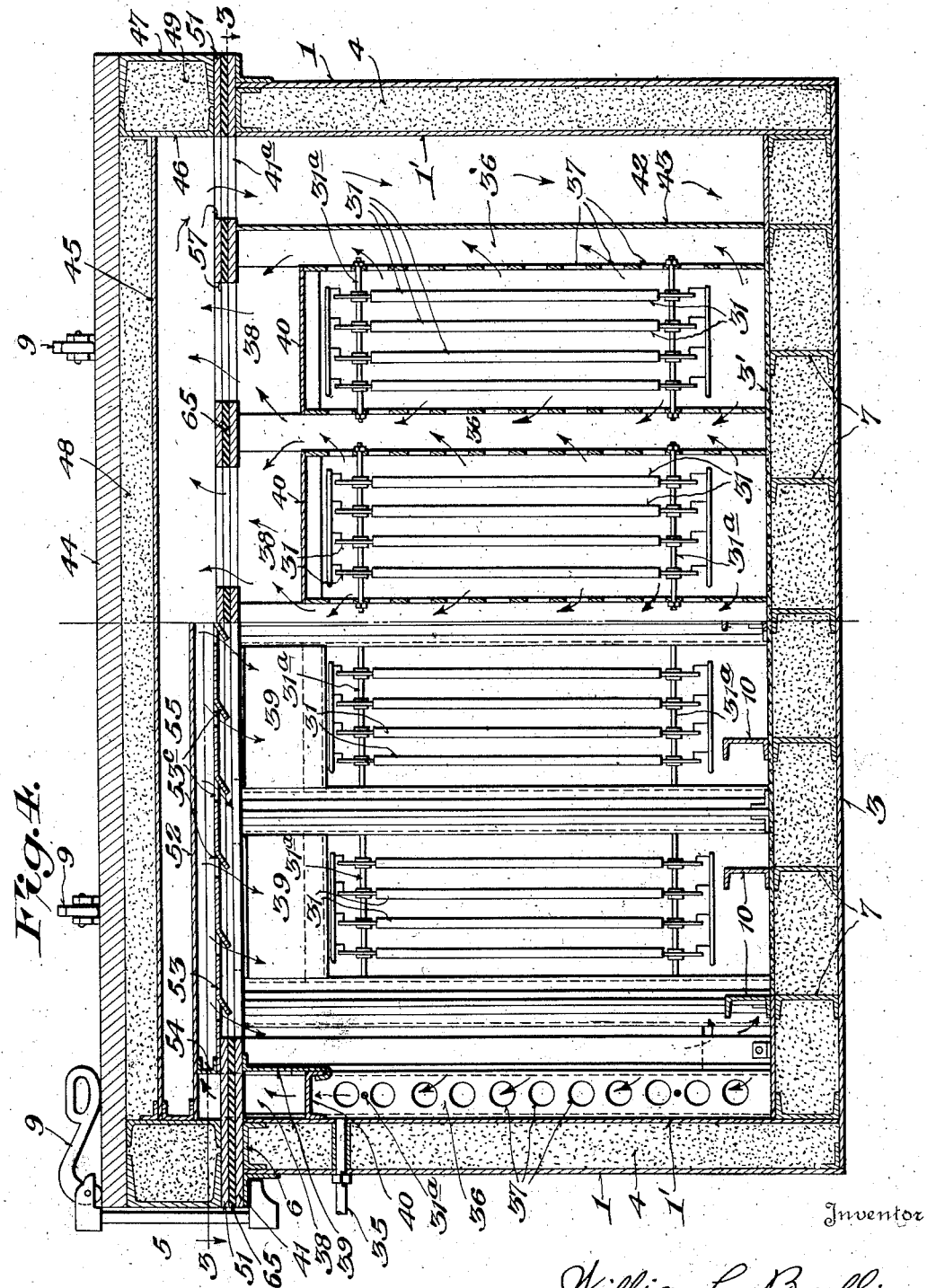

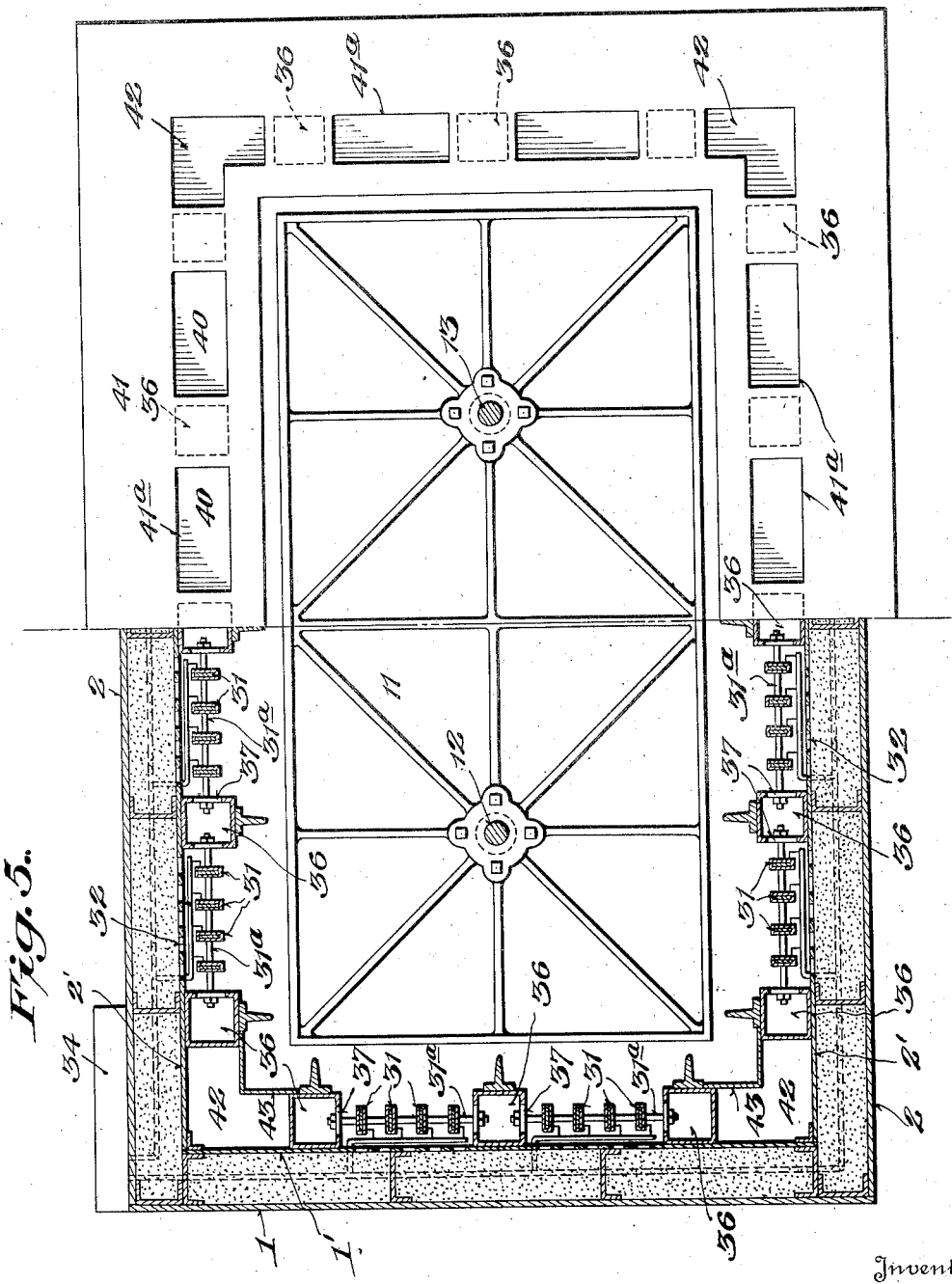

1,539,239

UNITED STATES PATENT OFFICE.

WILLIAM C. BULL, OF BROOKLYN, NEW YORK.

APPARATUS FOR MAKING REENFORCED GLASS.

Application filed September 1, 1922. Serial No. 585,599.

*To all whom it may concern:*

Be it known that I, WILLIAM C. BULL, a citizen of the United States, residing at Brooklyn, in the county of Kings and State of New York, have invented certain new and useful Improvements in Apparatus for Making Reenforced Glass, of which the following is a specification, reference being had therein to the accompanying drawing.

This invention relates to an improved apparatus for making reenforced glass composed of glass combined with transparent cellulose material, pyrolin, viscose, casein, or other material of a similar nature.

In the manufacture of such reenforced, laminated, non-shatterable, scatterless glass, a sheet or layer of transparent cellulose material or the like is arranged between the sheets of glass and united thereto by heat and pressure. Celluloid in different forms, gelatine, and the like, and solvents are employed, a favored method being to first coat the glass with a gelatinous preparation and to employ a volatile liquid of hygroscopic properties for the purpose of softening or making sticky under elevated temperature the gelatinous coating on the glass and at the same time acting as a solvent in common between the gelatinous coating and the pyrolin or other intermediate membrane. In order to obtain a good product, it is highly important that moisture be excluded from the material during the operation, owing to its destructive effect upon the substances employed, and more particularly because it hinders the adhesive action, the exhausting or expelling of excess solvent, gases and confined air, and when absorbed by the cellulose material prejudically effects the solidity and transparency of the product. Uniform pressure and heat throughout the entire areas being treated are important considerations in order to obtain a complete and uniform adhesion of the layer of celluloid or the like over the entire surfaces of the glass, and a product possessing the desired qualities of uniform and perfect transparence, resistance to shocks and perforation, and adherence of the fragments of the glass to the celluloid layer or the like in the case of breakage. It has heretofore been proposed to place a sheet or sheets of glass and a sheet of pyrolin for a single composite plate within a rubber bag or sealed container having flexible walls, and to place the whole within a closed chamber in which heat and pressure is developed by steam and water supplied to the chamber. From a practical standpoint, such an apparatus presents serious draw backs on account of the difficulty under operative conditions, of preventing leakage of the steam or water from the pressure chamber to the interior of the rubber bag or sealed container and the serious losses in production resulting therefrom; the difficulties met with in obtaining a certain constant uniform pressure and contact, and heat effect throughout the surfaces to be treated, the time and attention required and the uncertain irregular nature attending the operation due to the extent of manual control involved, the restriction as to the amount of material that can be treated at a single operation, and the amount of time and work required in charging and removing the material from the apparatus incident to the particular nature thereof.

The object of the present invention is to provide an improved apparatus; to provide for the treatment of the material in relatively large batches, to provide improved pressure applying and heating means, and automatic control mechanism therefor, to provide for a more uniform positive pressure and heating treatment throughout the entire area of the surfaces to be treated, and under more favorable conditions for the removal of the surplus solvent and gases, etc.; to avoid all danger of subjecting the material to the damaging influence of moisture while under treatment and the losses in production incident thereto, to provide improved air circulating means to assist in the treatment; and to generally improve and simplify the apparatus whereby the time and cost of production is reduced to a considerable extent and a more uniform superior product is obtained.

The invention, with other objects and advantages thereof, and the particular construction, combination and arrangements of parts comprising the same will be understood from the hereinafter contained detailed description, when considered in connection with the accompanying drawings, forming part hereof, and illustrating one embodiment of the invention.

In the drawings:

Figure 1 is a top plan view of an apparatus constructed in accordance with the present invention.

Fig. 2 is a section on the line 2—2, Figure 1, looking in the direction of the arrows.

Fig. 3 is a horizontal section on the line 3—3, Figure 4.

Fig. 4 is a vertical section on the line 4—4, Figure 3.

Fig. 5 is a part horizontal section and plan view, the part in section being taken on the line 5—5, Figure 2.

Fig. 6 is a detail view of one of the presser plates or frames.

The invention comprehends the use of a closed vessel or vault like receptacle adapted to contain a plurality of superposed plate units, improved pressure applying means not involving the use of steam, water or liquid within the vessel, combined presser and separating plates or frames for the plate units, in combination with means for supplying dry heat to the receptacle, means for exhausting air from the receptacle, and means for circulating air within the receptacle, the material to be treated being arranged in a stack within the receptacle in spaced relation with the walls thereof and directly subjected to temperature conditions, etc. therein.

While a specific embodiment of the invention is illustrated in the drawings, it will of course be understood that changes and variations in the particular construction shown and the embodiment of the invention in other forms, as will appeal to those skilled in the art, and falling within the scope of the appended claims, may be practiced without departing from the spirit of the invention.

In the particular embodiment of the invention illustrated in the drawings, the receptacle or vault is rectangular shaped, having double side, end, and bottom walls 1—1', 2—2', 3—3', with a heat insulating lining 4 of asbestos wool or other suitable material arranged therebetween, and a removable cover 5, the same being constructed of sheet metal and reenforced by channel bars 6—7, as shown. Cam levers 9 or other equivalent quick detachable means is provided for securing the cover 5 in place on the receptacle. The receptacle is of a size to accommodate a number of plate units arranged in superposed relation and spaced a substantial distance from the walls thereof as illustrated Figure 2 of the drawing. On the bottom wall 3 of the receptacle is provided a series of bars or channel members 10 arranged in spaced parallel relation, and spaced at their sides and ends from the side and end walls 1—2 of the receptacle, said bars or channel members affording a substantial open support for the stack of material above the bottom wall 3 of the receptacle.

Means for applying pressure endwise of the stack of plates is provided, said means including a movable platen 11, compression screws 12—13, and a motor 14. The screws 12—13, are operatively connected at their lower ends with the movable platen 11 and engage nuts 15—16, rotatably mounted on the cover 5. The nuts 15—16 have worm gears 15ª—16ª, meshing with worms 17—18, on shaft 19—20, said shafts in turn having helical gears 21—22 meshing with helical gears 23—24 on a shaft 25, a spur-gear 26 on the latter shaft meshing with a pinion 27 on the drive shaft of the motor. 28 designates conductors leading off to a conventional form of automatic overload control device 28ª, which serves to automatically prevent the material from being subjected to pressure greater than the predetermined requirement to insure a uniform contact pressure within the individual layers of the assembled product. 28ᵇ are conductors leading from the automatic control device 28ª to a suitable manual control switch (not shown). Combined presser and spacer plates or frames 29, and cushioning mats 30 are also provided, the same being arranged as illustrated Figure 2, a presser plate 29 with a cushioning mat 30 at each side thereof being interposed between the several plate units. Each plate unit, in the present instance, comprises three sheets of glass, a relatively thick central sheet designated $a$ and thinner sheets $b$, $c$, at each side of the central sheet $a$. The presser plates or frames are open at the top, bottom, side and ends to provide air circulating ducts, see particularly Figure 6, said plates being shown composed of upper and lower metal sheets 29ª—29ᵇ provided with a plurality of openings $d$—$e$, and intermediate members 29ᶜ—29ᵈ of channel iron. The mats 30 are formed of sheets of relatively hard rubber or other suitable material possessing the desired cushioning and heat resisting qualifications.

Heat is supplied to the interior of the receptacle through the medium of a plurality of electrical heating units located within the receptacle along the side and end walls thereof. The electrical heating units may take various forms and any desired number of the same may be employed, in the present instance, one of the conventional types being shown comprising a series of strips 31. The heating units are shown supported from the walls of the receptacle by rods 31ª. 32 designates conductors leading from the several heating units to a control box 34, the units being preferably connected in alternate groups, and appropriate switch mechanism (not shown) being provided whereby different units or groups of units may be employed, independently of the others, as desired to regulate the heat supplied to the receptacle. Any suitable temperature indicating means (not shown) may be employed.

35 designates a pipe connection leading to the interior of the chamber and adapted to be connected with any suitable vacuum system for exhausting air from the receptacle.

In order to facilitate the cooling of the material, and to otherwise assist in the treatment as found desirable, means is provided for, at times, circulating air within the receptacle around and through the stack of material. Located at intervals along the side and end walls of the receptacle at the interior thereof are a series of vertical flues 36, said flues being provided with a plurality of openings 37 in one side wall thereof, and communicating at their upper ends with a series of chambers 38 formed by plates 39—40 extending intermediate the flues 36, and a plate 41 secured over the upper edge of the side and end walls of the receptacle and extending inwardly therefrom over the upper ends of said flues. At the corners are vertical flues 42 formed by angle sheets 43 and the side walls of adjacent flues 36, said flues 42 terminating short of the bottom wall 3 of the receptacle and at their upper ends communicating with openings 41ª in the plate 41. The cover 5 is shown made up of upper and lower plates 44—45, and channel members 46—47, with heat insulating linings 48—49, the whole being suitably secured together and arranged to provide a depending marginal part and chamber at the under side thereof. The cover is provided with horizontal partition plates 51—52—53, and vertical partition walls 54 dividing the chamber at the under side of the cover into upper and lower compartments 55—56. The horizontal partition plates 51—52 are provided with ports and adjoining short flue connections 57—58 therebetween, and the vertical partition wall 54 has ports 54ª at the corners, the ports of the horizontal partition plate 51 being adapted to register with ports 41ª in the plate 41 leading to the chamber 38, when the cover 5 is in position on the receptacle, so that communication is provided between the upper ends of flues 36 and the upper compartment 55, and the corner flues 42 communicating with the lower compartment 56. 59—59′ designate respectively air intake and outlet ports in the cover and the side walls of the receptacle, and 60 are dampers controlling said ports. The horizontal partition 52 is provided with a central opening and at said opening is arranged a centrifugal fan 61.

62 designates a casing part for the fan, and 63 is an electric motor for driving the fan, the fan shaft 64 extending through an opening in the cover to the motor. The fan is adapted to be operated to draw air from the upper compartment 55 and force the same downwardly into the lower compartment 56, and from thence to the interior of the receptacle. In order to provide for a uniform distribution of air throughout the interior of the receptacle, the horizontal partition 53 is provided with a multiplicity of ports or openings 53ª, and said partition has a grating or perforated casing part 53ᵇ in line with the fan outlet. The partition is conveniently formed of a metal sheet with stamped out portions 53ᶜ, said stamped out portions at opposite sides and ends of the sheet being inclined outwardly in opposite directions to deflect the air outwardly toward the side and end walls of the receptacle When the fan is in operation with the dampers 60 closed air will be drawn in from the upper compartment 55 and forced downwardly into the lower chamber 56, and into the interior of the receptacle over, around, and through the stack of material, the air passing into the flues 36, and thence upwardly through the same back to the upper compartment 55, said flues 36 serving as up take flues. Some of the air forced into the lower compartment 56 will pass to the space at the corners thereof and out through the ports 54ª into the corner flues, and down through said flues to the lower part of the receptacle. Provision is thus made for obtaining a positive or forced circulation of hot dry air within the receptacle, over and around the stack of material, the air flow and arrangement of the heating elements being such as to obtain good heating effects, and the air entering the channels of the presser plates, so that a uniform heat throughout the entire areas of the plate units is effected. It will be understood that the fan may be operated to create a circulation within the receptacle under different conditions of pressure within the same, as found to be effective in assisting in heating the material and removing all gases or vapors from between the elements of the plate units.

When the fan is operated with the damper 60 open, fresh air from the outside will be drawn into the upper compartment 55 and forced into the lower chamber 56, and thence downwardly over and around the stack of material and out through the ports 59′, fresh air in sufficient volume being admitted to obtain a gradual and regular reduction of the temperature of the receptacle and the material, the electrical heating elements during the cooling period being cut out or not supplied with electrical energy.

65 designates a layer of packing of any suitable material secured over the plate 41, the layer of packing being provided with suitable openings corresponding to the port openings in said plate, and suitable packing 66—67—68 is provided at the openings in the cover for the screws 12—13, and the fan shaft 64.

In the use of the apparatus, a traveling crane or other suitable hoisting mechanism is employed to move the stack of material into and out of the receptacle, and hoisting mechanism may be employed for removing and putting the cover in place. After the material, arranged in stack formation with the presser and separator plates and mats, is placed within the receptacle upon the bars or channel members 10, and the cover clamped on, the material is subjected to heat and pressure, as desired, through the medium of the pressure applying means and the electrical heating units. Prior to the heat and pressure treatment, air is exhausted from the receptacle through the vacuum system connection 35, and preferably a state of vacuum or low pressure condition is maintained during most of the period of the heat and pressure treatment. When found desirable, the fan may be operated, with the dampers closed, to create a circulation within the receptacle. After the heating and pressure treatment has been completed, and the dampers 60 are opened, the fan is operated to circulate air from the outside within the receptacle to gradually cool down the material.

What I claim is:

1. In an apparatus for the purpose set forth, a closed chamber adapted to contain a plurality of superposed composite plate units, means for applying pressure endwise of a stack of plate units within the chamber without the introduction of moisture within the chamber, and means for supplying dry heat to the interior of the chamber.

2. In an apparatus for the purpose set forth, a closed chamber adapted to contain a plurality of superposed composite plate units, means for applying pressure endwise of a stack of plate units within the chamber without the introduction of moisture within the chamber, and means for supplying heat to the interior of the chamber, said last mentioned means including electrical heating elements within the chamber.

3. In an apparatus for the purpose set forth, a closed chamber adapted to contain a plurality of superposed composite plate units, means for applying pressure endwise of a stack of plate units within the chamber without the introduction of moisture within the chamber, means for supplying dry heat to the interior of the chamber, and means for exhausting air from the chamber.

4. In an apparatus for the purpose set forth, a closed chamber adapted to contain a plurality of superposed composite plate units, means for applying pressure endwise of a stack of plate units within the chamber without the introduction of moisture within the chamber, means for supplying dry heat to the interior of the chamber, and means for circulating air within the chamber about the stack of plate units.

5. In an apparatus for the purpose set forth, a closed chamber adapted to contain a plurality of superposed composite plate units, said chamber having valve controlled air inlet and exhaust ports, means for applying pressure endwise of a stack of plate units within the chamber without the introduction of moisture within the chamber, means for supplying dry heat to the interior of the chamber, and means for circulating air through the chamber.

6. In an apparatus for the purpose set forth, a closed chamber adapted to contain a plurality of superposed composite plate units, and means for applying pressure endwise of a stack of plate units within the chamber without the introduction of moisture within the chamber, means for supplying dry heat to the interior of the chamber, means for exhausting air from the chamber, and means for circulating air within the chamber.

7. In an apparatus of the class described, a closed chamber adapted to contain a plurality of superposed composite plate units, means for supplying dry heat to the interior of the chamber, means for applying pressure endwise of a stack of plate units within the chamber, said means including a movable platen within the chamber, a plurality of compression screws operatively connected with the platen and extending to the exterior of the chamber, an electric motor and gear connections between the motor and compression screws located exteriorly of the chamber, and automatic control means for the motor to regulate the pressure applied to the stack of plate units.

8. In an apparatus of the class described, a closed chamber adapted to contain a plurality of superposed composite plate units, a plurality of tubular presser plates adapted to be interposed between the plate units, said plates being open at the tops and sides thereof, means for applying pressure endwise of a stack of plate units and presser plates within the chamber, and means for supplying dry heat to the interior of the chamber.

9. In an apparatus of the character described, a closed chamber adapted to contain a plurality of superposed composite plate units, a plurality of tubular presser plates adapted to be interposed between the plate units, said plates being open at their sides and ends, means for applying pressure endwise of a stack of plate units and presser plates within the chamber, said means including a movable platen, means for supplying dry heat to the interior of the chamber, and means for circulating air within the chamber about the stack of plate units and presser plates.

10. In an apparatus of the class described, a closed receptacle adapted to contain a plurality of superposed composite plate units in spaced relation with the walls thereof, a chamber within the vessel extending across the upper part thereof above the space for the stack of plate units, vertical flues extending along the side walls communicating with said chamber and the space at the lower part of the vessel, a fan for circulating air from said chamber downwardly into the interior of the vessel, means for applying pressure endwise of a stack of plates within the receptacle, and means for supplying dry heat to the interior of the vessel.

11. In an apparatus of the class described, a closed receptacle adapted to contain a plurality of superposed composite plate units in spaced relation with the walls thereof, a chamber within the vessel extending across the upper part thereof above the space for the stack of plate units, said receptacle having damper controlled air inlets leading from the exterior of the receptacle to said chamber, vertical flues extending along the side walls of the receptacle communicating with the said chamber and the space at the lower part of the receptacle, a fan for circulating air from said chamber downwardly into the interior of the vessel, means for applying pressure endwise of a stack of plates within the receptacle, and means for supplying dry heat to the interior of the receptacle.

12. In an apparatus of the class described, a closed receptacle adapted to contain a plurality of superposed composite plate units in spaced relation with the walls thereof, a chamber within the vessel extending across the upper part thereof above the stack of plate units, vertical flues extending along the side walls of the receptacle communicating with said chamber and the space at the lower part of the receptacle, a fan for circulating air from said chamber downwardly into the interior of the vessel, means for applying pressure endwise of a stack of plates within the receptacle, and a plurality of electrical heating elements within the chamber near the side walls thereof.

13. In an apparatus of the class described, a closed receptacle adapted to contain a plurality of superposed composite plate units in spaced relation with the walls thereof, a chamber within the vessel extending across the upper part thereof above the space for the stack of plate units, vertical flues within the chamber extending along the side walls thereof in spaced relation comunicating with said chamber and the space at the lower part of the receptacle, a fan for circulating air from said chamber downwardly into the interior of the vessel, means for applying pressure endwise of a stack of plates within the receptacle, and a plurality of electrical heating elements located in the spaces between said flues.

14. In an apparatus of the class described, a closed receptacle adapted to contain a plurality of superposed composite plate units in spaced relation with the walls thereof, a chamber within the vessel extending across the upper part thereof above the space for the stack of plate units, vertical flues extending along the side walls communicating with said chamber and the space at the lower part of the vessel, a fan located centrally of the upper part of the receptacle for circulating air from said chamber downwardly into the interior of the vessel, means for applying pressure endwise of a stack of plates within the receptacle, and means for supplying dry heat to the interior of the vessel.

15. In an apparatus of the class described, a closed receptacle adapted to contain a plurality of superposed composite plate units in spaced relation with the side walls thereof, a chamber within the receptacle extending across the upper part thereof above the space for the stack of plate units, a horizontal partition dividing the chamber into two compartments in communication one with the other, and one of said compartments having ports leading into the interior of the receptacle, vertical uptake flues extending along the sides of the chamber and communicating with one of said compartments and the space within the lower part of the receptacle, vertical downtake flues comunicating with the other compartment of the chamber and the space within the lower part of the receptacle, a fan for circulating air from one of said compartments through the other compartment into the interior of the receptacle, means for applying pressure endwise of a stack of plate units within the chamber, and means for supplying dry heat to the interior of the receptacle.

16. In an apparatus of the class described, a closed vessel adapted to contain a plurality of superposed composite plate units in spaced relation with the side walls thereof, a chamber within the receptacle extending across the upper parts thereof above the space of the stack of plate units, a horizontal partition dividing the chamber into an upper and lower compartment, said partition having a central opening, and the bottom wall of the chamber being provided with a plurality of ports leading to the interior of the vessel, vertical uptake flues extending along the side of the vessel and communicating with one of the compartments and the space within the lower part of the vessel, vertical downtake flues communicating with the other compartment of the chamber and the space within the lower part of the vessel, a fan for circulating air from the upper compartment into the other compartment and into the interior of the receptacle, means for applying pressure endwise of a stack of plate units within the vessel, and means for supplying dry heat to the interior of the chamber.

17. In an apparatus of the class described, a closed receptacle adapted to contain a plurality of superposed composite plate units in spaced relation with the walls thereof, a chamber within the receptacle extending across the upper part thereof above the space of the stack of plate units, vertical flues extending along the side-walls of the receptacle and communicating with said chamber and the space at the lower part of the receptacle, a fan for circulating air from said chamber downwardly into the interior of the receptacle, means for applying pressure endwise of a stack of plates within the receptacle, and a plurality of electrical heating elements within the chamber near the side walls thereof, and controlling means providing for supplying electrical energy to one or more of the electrical heating elements.

18. In an apparatus of the character described, a closed chamber adapted to contain a plurality of superposed composite plate units, a plurality of presser plates adapted to be interposed between the plate units, each of said plates having interior air ducts extending through the same from end to end, means for applying pressure endwise of a stack of plate units and presser plates within the chamber, means for supplying dry heat to the interior of the chamber, and means for circulating air within the chamber about the stack of plate units and presser plates.

19. In an apparatus of the character described, a closed chamber adapted to contain a plurality of superposed composite plate units, a plurality of presser plates adapted to be interposed between the plate units, each of said presser plates comprising a pair of plate members and a plurality of members secured between the plate members and spacing the same to provide air passages therebetween, means for applying pressure endwise of a stack of plate units and presser plates within the chamber, means for supplying dry heat to the interior of the chamber, and means for circulating air within the chamber about the stack of plate units and presser plates.

20. An apparatus for fabricating reenforced glass including an oven-chamber, means for sealing therein a press for the glass product, and means for supplying dry heat to the chamber while said glass product is under pressure.

21. An apparatus for fabricating reenforced glass including an oven-chamber, means for sealing a press therein for the glass product, means for maintaining a moistureless condition in the chamber, and means for supplying dry heat to the chamber while the glass product is under pressure.

22. An apparatus for fabricating reenforced glass including an oven-chamber, means for sealing a press therein for the glass product, vacuum means for maintaining a moistureless condition in the chamber, and means for supplying dry heat to the chamber while the glass product is under pressure.

23. An apparatus for fabricating reenforced glass including an oven-chamber, a press supported within the chamber and having means for holding a plurality of the glass products, means for maintaining a moistureless condition in the chamber, and means for supplying dry heat to the chamber while the glass products are under pressure.

24. An apparatus for fabricating reenforced glass including an oven-chamber, means for sealing therein a press having means for holding and simultaneously operating upon a plurality of glass products, means for maintaining a moistureless condition within the chamber, and means for supplying dry heat to the chamber while pressure is being applied to the several glass products.

25. An apparatus for fabricating reenforced glass including an oven-chamber, means for sealing a press therein for the glass product, vacuum means for exhausting air from the chamber, and separate means for supplying dry heat to the chamber while the glass product is under pressure.

26. An apparatus for fabricating reenforced glass including an oven-chamber, means for sealing a press therein for the glass product, means for supplying dry heat to the chamber while the glass product is under pressure, and means for exhausting air during the dry heat and pressure period.

27. An apparatus for fabricating reenforced glass including an oven-chamber, means for sealing a press therein for the glass product, means for supplying dry heat to the chamber while the glass product is under pressure, and means for exhausting air during the dry heat and pressure period and for causing circulation of the heated air currents during the final stage of the dry heat and pressure period.

28. An apparatus for fabricating reenforced glass including an oven-chamber, means for sealing a press therein for glass product, means for supplying dry heat to the chamber while the glass product is under pressure, means for circulating the dry heat during the final stage of the heat and pressure period, and means for circulating cooler air through the chamber at the completion of the dry heat and pressure period.

29. An apparatus for making reenforced glass including an oven-chamber, a closure therefor, and a press device supported and carried by said closure.

30. An apparatus for making reenforced glass including an oven-chamber, a closure therefor, a press device carried and supported by the closure and means carried by the pressure for circulating air currents into the oven chamber about the press device.

31. A laminated glass fabricating apparatus including an oven open at one side and having air flues therein, a closure for the open side of the oven and also having air flues adapted to register with the air flues of the oven, a press device carried by the closure and adapted to be inserted within and removed from the oven by the emplacement and removal of the closure from the open side of the oven, means carried by the closure for applying pressure to said press device, and an air blast generating unit also carried by the closure and adapted to circulate air currents through said flues.

32. A laminated glass fabricating apparatus including an oven having an opening, a press device including a plurality of press units arranged within the oven parallel to the opening, a closure at the open side of the oven and having air flues therein, and air circulating means carried by the closure and arranged to direct an air blast into the oven at right angles to the plate units.

33. A laminated glass fabricating apparatus including an oven open at one side and having air conducting flues arranged along opposite walls thereof, a press device including a plurality of individual press units arranged within the oven parallel to the plane of the opening at one side of the oven, a detachable closure having flues adapted to register with the flues in the oven, and an air blast generating device carried by the closure and adapted to project air currents into the opening at right angles to the plane of the press units.

34. A laminated glass fabricating apparatus including an oven open at one side and having air conducting flues arranged along opposite walls thereof, a press device including a plurality of individual press units arranged within the oven parallel to the plane of the opening at one side of the oven, a detachable closure having flues adapted to register with the flues in the oven, a foraminous air distributing plate carried by the closure and communicating with said flues at the side walls of the oven and an air blast generating device also carried by the closure adapted to direct air against said partition plate whereby it will flow toward the press unit and also through the flues of the closure and flues of the side walls of the oven.

In testimony whereof I hereunto affix my signature.

WILLIAM C. BULL.